(12) United States Patent
Callen et al.

(10) Patent No.: US 10,329,656 B2
(45) Date of Patent: Jun. 25, 2019

(54) PRE-FORMULATED POWDER FEEDSTOCK

(71) Applicant: OERLIKON METCO (US) INC., Westbury, NY (US)

(72) Inventors: Brian Callen, Sherwood Park (CA); Jing Liu, Syosset, NY (US); Montia Nestler, Ridgefield, NJ (US); Eugene Stelmack, Fort Saskatchewan (CA); Mathias Runte, Bonn (DE)

(73) Assignee: OERLIKON METCO (US) INC., Westbury, NY (US)

( * ) Notice: Subject to any disclaimer, the term of this patent is extended or adjusted under 35 U.S.C. 154(b) by 0 days.

(21) Appl. No.: 15/317,792

(22) PCT Filed: Sep. 18, 2014

(86) PCT No.: PCT/US2014/056323
§ 371 (c)(1),
(2) Date: Dec. 9, 2016

(87) PCT Pub. No.: WO2016/043754
PCT Pub. Date: Mar. 24, 2016

(65) Prior Publication Data
US 2017/0121804 A1    May 4, 2017

(51) Int. Cl.
| | | |
|---|---|---|
| C09D 1/00 | (2006.01) | |
| C23C 4/04 | (2006.01) | |
| B22F 1/00 | (2006.01) | |
| B22F 3/115 | (2006.01) | |
| C23C 4/134 | (2016.01) | |
| C09D 7/40 | (2018.01) | |
| C09D 7/63 | (2018.01) | |
| C09D 129/04 | (2006.01) | |

(52) U.S. Cl.
CPC .............. *C23C 4/04* (2013.01); *B22F 1/0062* (2013.01); *B22F 1/0096* (2013.01); *B22F 3/115* (2013.01); *C09D 1/00* (2013.01); *C09D 7/63* (2018.01); *C09D 7/68* (2018.01); *C09D 7/69* (2018.01); *C09D 129/04* (2013.01); *C23C 4/134* (2016.01)

(58) Field of Classification Search
CPC .............. C23C 4/04; C23C 4/134; C09D 1/00
See application file for complete search history.

(56) References Cited

U.S. PATENT DOCUMENTS

| | | | |
|---|---|---|---|
| 2002/0027130 A1* | 3/2002 | Miyata ................ | H05B 3/143 |
| | | | 219/444.1 |
| 2004/0197580 A1 | 10/2004 | Dorfman et al. | |
| 2005/0132843 A1 | 6/2005 | Jiang et al. | |
| 2006/0289405 A1 | 12/2006 | Obserste-Berghaus et al. | |
| 2007/0191509 A1* | 8/2007 | Kobayashi ............ | B82Y 30/00 |
| | | | 523/160 |
| 2011/0003084 A1 | 1/2011 | Berghaus et al. | |
| 2011/0021797 A1 | 1/2011 | Tiefenbruck et al. | |
| 2012/0124899 A1 | 5/2012 | Difrancesco et al. | |
| 2012/0216713 A1 | 8/2012 | Cheema et al. | |
| 2012/0272869 A1 | 11/2012 | Shaw et al. | |

FOREIGN PATENT DOCUMENTS

| | | |
|---|---|---|
| CN | 101148747 | 3/2008 |
| CN | 100423873 | 10/2008 |
| CN | 102281945 | 12/2011 |
| CN | 102581292 | 7/2012 |
| CN | 102861914 | 1/2013 |
| JP | 10-88311 | 4/1998 |
| WO | 02/05989 | 1/2002 |
| WO | 2008/010533 | 1/2008 |

OTHER PUBLICATIONS

International Preliminary Report on Patentability and Written Opinion issued with respect to Application No. PCT/US2014/056323, dated Mar. 30, 2017.
European Search Report issued with respect to Application No. EP 14901897, dated Apr. 6, 2018.
Chinese Office Action (with English translation) dated Jul. 3, 2018.

\* cited by examiner

*Primary Examiner* — Hannah J Pak
(74) *Attorney, Agent, or Firm* — Greenblum & Bernstein, P.L.C.

(57) ABSTRACT

A powder composition adapted for use in suspension thermal spray coating processes. The powder includes agglomerated and/or non-agglomerated particles having at least one dispersing agent deposited thereon. The composition results in a homogeneous, stable suspension when combined with a liquid carrier for use in suspension thermal spray coating processes.

36 Claims, 5 Drawing Sheets

PRE-FORMULATED POWDER FEEDSTOCK

TECHNICAL FIELD

The field of art to which this invention generally pertains is suspension thermal spraying.

BACKGROUND

Suspension plasma spraying (SPS) is a relatively new process that is derived from atmospheric plasma spraying (APS) for depositing coatings on various substrate materials. The feedstock for use in such processes typically consist of fine particles suspended in liquid carriers that are often hazardous in nature, are highly specialized, and therefore present challenges relating to processing, handling, storage and transportation. As a result, there is a desire to provide these specialized feedstocks by alternative production and delivery methods that are more efficient and cost effective.

The materials and processes described herein meet the challenges described above, and in addition, provide additional benefits and advantages not currently recognized in this art.

BRIEF SUMMARY

A powder composition is described adapted for use in suspension thermal spray coating processes. The composition includes primary particles having at least one dispersing agent deposited thereon, the composition resulting in a homogeneous, stable suspension when combined with a liquid carrier for use in suspension thermal spray processes.

Additional embodiments include: the composition described above where the primary particles are agglomerated and/or non-agglomerated; the composition described above where the primary particles are up to about 10 microns in size; the composition described above where the primary particles are up to about 2 microns in size; the composition described above where the primary particles are up to about 0.1 micron in size; the composition described above where the primary particles are about 0.01 to about 0.1 micron in size; the composition described above where the primary particles comprise at least one of: oxides of aluminum, zirconium, titanium, chromium, manganese cobalt, yttrium, lanthanum, lanthanum strontium, manganese, manganese cobalt iron, dysprosium; carbides of titanium, tantalum, tungsten, chromium, vanadium, nickel; lanthanum strontium manganite, pure metal and/or alloys based on nickel, cobalt iron, chromium, aluminum, copper; yttrium fluoride, lanthanum strontium cobalt ferrite, zirconia gadolinia ytterbia yttria, gadolinium zirconate, lanthanum strontium maganate, lanthanum strontium cobalt ferrite; zirconia stabilized with magnesia, calcia, dysprosia, yttria, ceria, ytterbia; ytterbium zirconate, strontium, and mixtures and/or composites thereof; the composition described above where the dispersing agent is a polymer salt, an inorganic salt, a non-ionic organic compound, and/or an acid or base that produces dispersion effect through pH; the composition described above where the dispersing agent is 2-[2-(2-methoxyethoxy) ethoxy] acetic acid; the composition described above where the dispersing agent is present in an amount of up to about 10% by weight; the composition described above where the dispersing agent is present in an amount of up to about 5% by weight; the composition described above where the dispersing agent is present in an amount of about 0.1% to about 1% by weight; the composition described above where the powder material additionally contains a binder deposited thereon; the composition described above where the binder is polyvinyl alcohol; the composition described above where the binder is present in an amount up to about 0.2% by weight; the composition described above where the binder is present in an amount of about 0.01% to about 0.2% by weight; the composition described above where the liquid carrier is an organic liquid; the composition described above where the carrier is one or more of a ketone, alcohol, glycol, and or aliphatic hydrocarbons; the composition described above where the carrier is one or more of water, acetone, methyl alcohol, ethyl alcohol, isopropyl alcohol, ethylene glycol, hexane, and/or octane; and the composition described above in the form of a paste.

These, and additional embodiments, will be apparent from the following descriptions.

DETAILED DESCRIPTION

Figure 1:
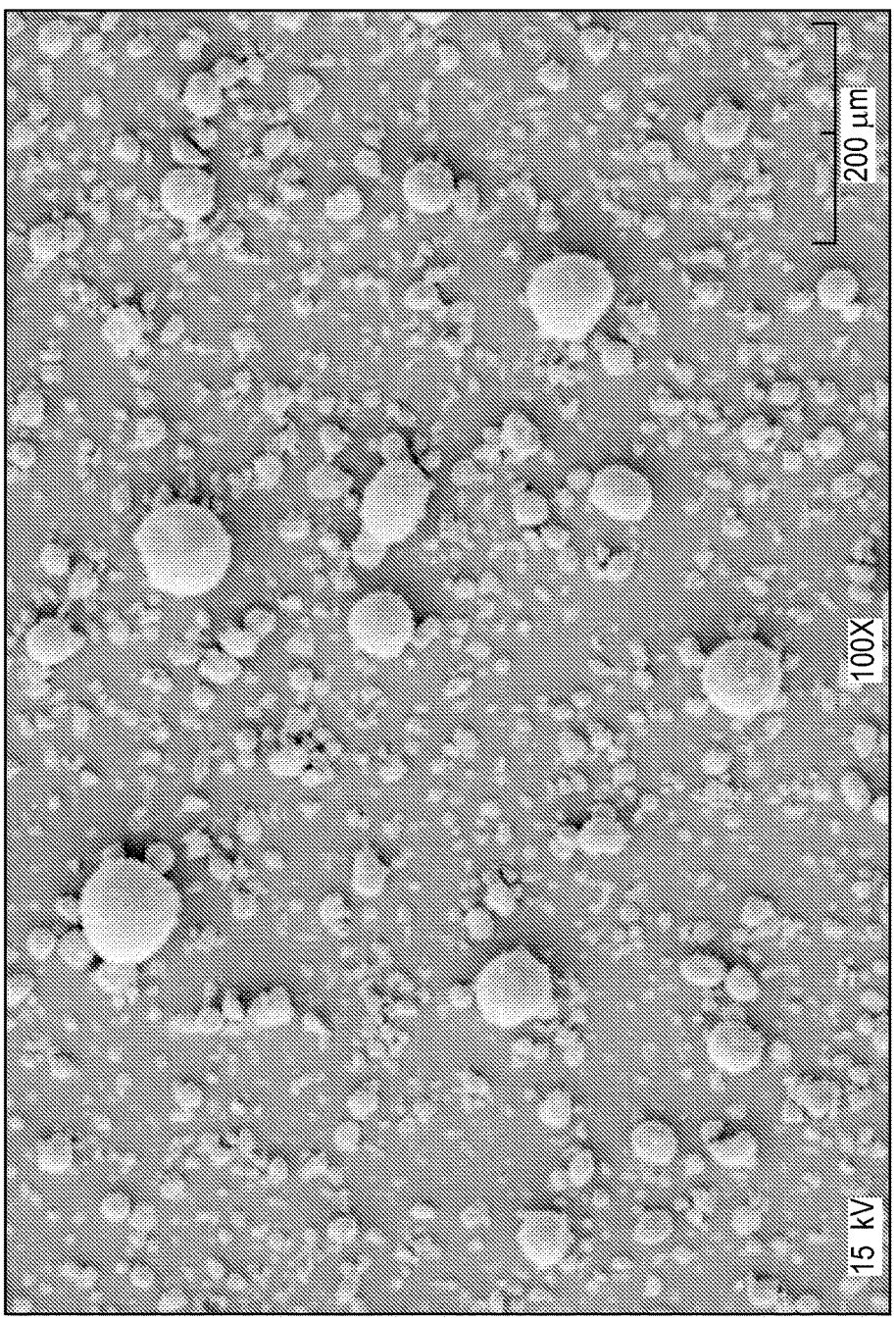
FIG. 1 shows an example of a spray dried powder described herein.
Figure 2:
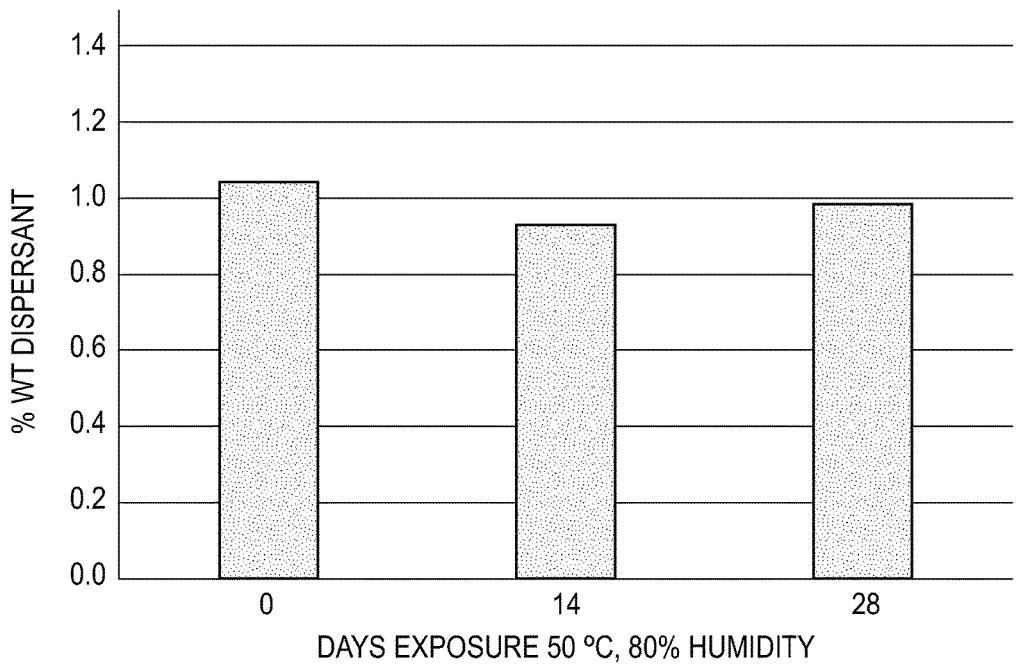
FIG. 2 shows examples of total carbon measurement for products produced as described herein.
Figure 3:
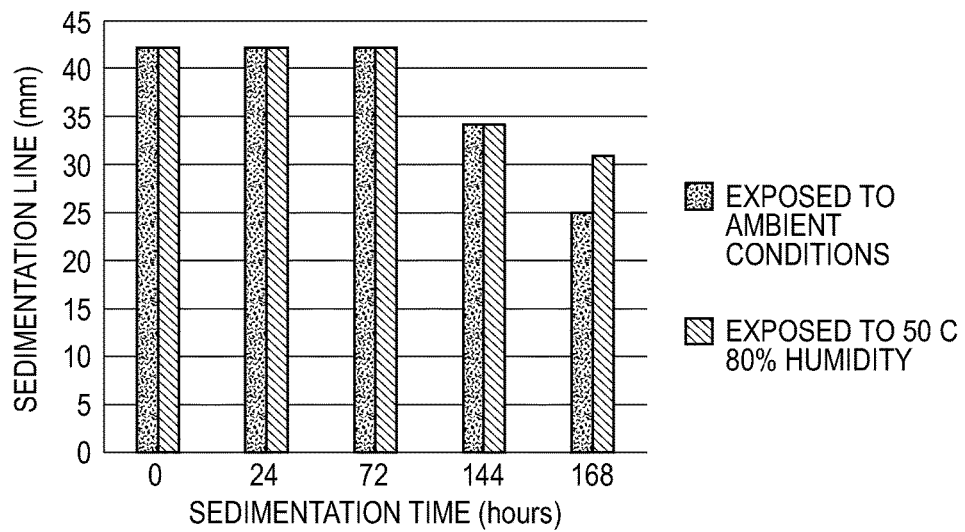
FIG. 3 shows examples of settling rates for products produced as described herein.
Figure 4:
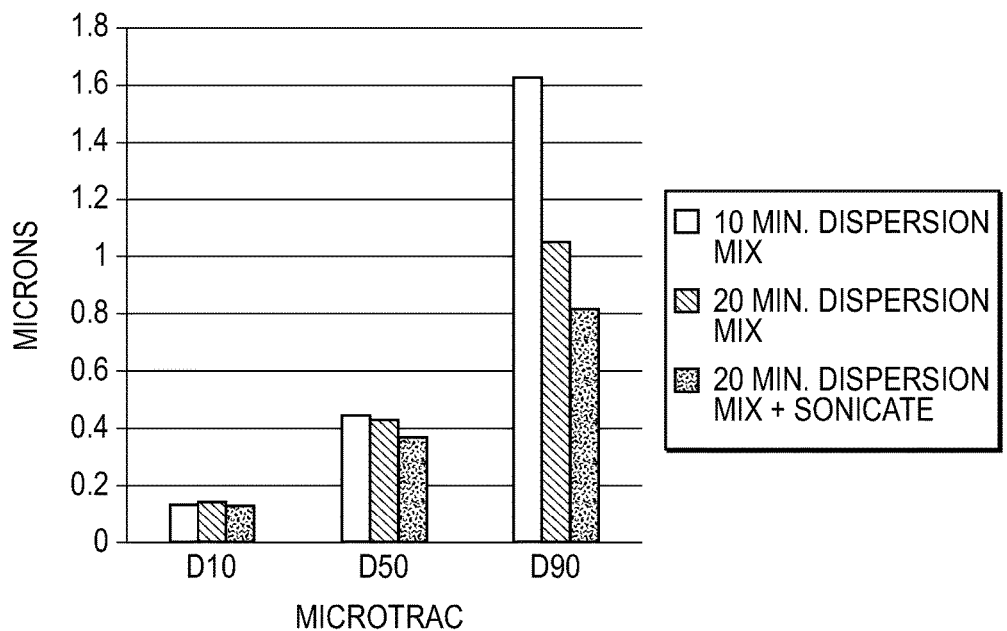
FIG. 4 shows examples of mixing times for agglomerates produced as described herein.

The particulars shown herein are by way of example and for purposes of illustrative discussion of the various embodiments of the present invention only and are presented in the cause of providing what is believed to be the most useful and readily understood description of the principles and conceptual aspects of the invention. In this regard, no attempt is made to show details of the invention in more detail than is necessary for a fundamental understanding of the invention, the description making apparent to those skilled in the art how the several forms of the invention may be embodied in practice.

The present invention will now be described by reference to more detailed embodiments. This invention may, however, be embodied in different forms and should not be construed as limited to the embodiments set forth herein. Rather, these embodiments are provided so that this disclosure will be thorough and complete, and will fully convey the scope of the invention to those skilled in the art.

Unless otherwise defined, all technical and scientific terms used herein have the same meaning as commonly understood by one of ordinary skill in the art to which this invention belongs. The terminology used in the description of the invention herein is for describing particular embodiments only and is not intended to be limiting of the invention. As used in the description of the invention and the appended claims, the singular forms "a," "an," and "the" are intended to include the plural forms as well, unless the context clearly indicates otherwise. All publications, patent applications, patents, and other references mentioned herein are expressly incorporated by reference in their entirety.

Unless otherwise indicated, all numbers expressing quantities of ingredients, reaction conditions, and so forth used in the specification and claims are to be understood as being modified in all instances by the term "about." Accordingly, unless indicated to the contrary, the numerical parameters set forth in the following specification and attached claims are approximations that may vary depending upon the desired properties sought to be obtained by the present invention. At the very least, and not as an attempt to limit the application of the doctrine of equivalents to the scope of the claims, each numerical parameter should be construed in light of the number of significant digits and ordinary rounding approaches.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements. Every numerical range given throughout this specification will include every narrower numerical range that falls within such broader numerical range, as if such narrower numerical ranges were all expressly written herein.

Additional advantages of the invention will be set forth in part in the description which follows, and in part will be obvious from the description, or may be learned by practice of the invention. It is to be understood that both the foregoing general description and the following detailed description are exemplary and explanatory only and are not restrictive of the invention, as claimed.

In the past, SPS feedstock materials have been provided in the form of ready-to-use liquid suspensions, or their individual components of powders (consisting of primary particles in agglomerated and/or non-agglomerated form), liquid media and dispersants as ingredients that are obtained from separate sources. Primary particles are referred to here as the smaller discrete particles that appear as single units or form into larger connected structures named here as agglomerates. A powder is a collection of particles that is composed of primary particles and/or agglomerations of primary particles and may include additional components such as binders.

Ready-to-use liquid suspensions have inherent disadvantages of complex packaging, costly transportation and limited shelf life. When suspensions are prepared from separate components, the user must have knowledge of, and account for the correct dosage level of dispersant as a distinct and necessary ingredient of the suspension formulation. The user would then calculate, measure, and dispense the prescribed quantity of dispersant according to the required suspension composition.

The ratio or percentage of feedstock powder to liquid media is referred to as the solids loading of the suspension. Suspension compositions may vary in terms of solids loading depending on the plasma spray equipment used or other considerations. Solids loading typically ranges from about 5% by weight to about 30% by weight, or greater, e.g., up to 50% by weight.

The dispersant being accounted for and controlled by the end user is undesirable from the standpoint of both the manufacturer and the end user. The manufacturer of a feedstock material that is designed for suspensions may have knowledge considered to be proprietary in the nature and application of certain dispersants Also, the end user, may be inconvenienced by performing associated tasks of accounting for and handling dispersants as separate components in making suspensions. The system described herein provides dry feedstock powder containing the optimum amount of dispersant (i.e. pre-formulated) which eliminates involvement by the end user, and is inducible to proprietary suspension compositions. Preferably the dry powder containing the dispersant is free-flowing, typically non-dusting, and capable of being poured in powder form, i.e., not a paste or a liquid. The invention provides the optimum amount of dispersant for the suspension independently and is thus self-correcting for any solids loading chosen by the end user, a feature that does not currently exist. That being said, it is also possible to mix sufficient liquid with the dry powder to form a paste, and still realize the benefits described herein, i.e., by the end user adding additional liquid on-site.

A pre-formulated submicron feedstock powder is described herein for use in suspension spray. Current feedstock powders require dispersing agents to be added as separate components when producing suspensions. Powders and especially submicron powders that can be loosely agglomerated and pre-loaded with dispersing agents via a spray-drying process provide a ready-formulated single component dry feedstock that reduces dusting, improves handling and allows for formulations to be made and quality controlled by the manufacturer. Any dispersing agent typically used in suspension thermal spraying can be used in the processes described herein, such as, for example, polymer salts, inorganic salts, and non-ionic organic compounds, etc. While the dispersing agent does provide benefits in the spray drying process, the amount and type of dispersing agent needed for the processes described herein must be such that they can produce a homogeneous, stable suspension for thermal spray coating when combined with the appropriate carrier. Typically such amounts when deposited on the final powder, represent up to about 10% by weight, with up to 5% by weight of the powder and amounts between about 0.1% and about 5% by weight particularly useful. While useful as described in the spray drying process, care should be taken to control the amount of dispersant used specifically for use in the suspension thermal process intended, for example, the use of too much dispersant in the spray drying process could produce the opposite effect of a destabilization or flocculation, or otherwise inhibit suspension in the suspension thermal spray process.

While some spray dried submicron powders are commercially available, among other things, they are not pre-loaded with dispersing agents as described herein for use in suspensions in thermal spray. Pre-loading of dispersant, together with agglomeration of the primary particles, greatly simplifies preparation of suspensions by the end user. Although agglomeration of the primary particles is preferred, it is not necessary in producing the same beneficial effect on the suspension as non-agglomerated primary particles similarly treated with the same quantity of dispersant by other methods. Dispersants may be deposited onto primary particles or agglomerates of primary particles by various conventional means. The method of forming a solution consisting of a dispersant solute dissolved into a solvent then forming a slurry with particles, followed by removal of solvent through an evaporation process such as drying, leaving the dispersant deposited on the primary particles and/or agglomerates formed from the primary particles is given. Thus spray drying as one specific example is not a required method for depositing dispersants onto the particles. Alternative deposition methods such as involving ordinary oven drying, or direct application of the dispersant to the particles or agglomerates by dry blending may be employed to similar effect.

Common suspension compositions involve flammable carrier liquids such as ethanol and isopropanol, which are often classified as hazardous materials. A major problem manufacturers face with the distribution of such fully-made suspensions is that they are difficult and expensive to warehouse and ship, due to the hazardous nature of alcohol, and will form sediments over time. The solutions described herein, among other things, allow the end-users to make-up fresh suspensions on-site using a few basic components of a pre-formulated agglomerated powder with, e.g., user supplied alcohol, and mechanical mixing/dispersing units, thus, for example, eliminating the need for costly handling, processing, storage and shipment of alcohol that would otherwise be required for fully made suspensions.

Sub-micron sized primary particles produced by Oerlikon Metco in mills using water media to a prescribed size distribution (typically about 0.2 to about 1 micron) to form a slurry are particularly useful. The milled slurry is transferred to a spray dryer where the water content is adjusted and a dispersant added to a prescribed content prior to drying. Binders can assist in the formation of agglomerates, e.g. spherical agglomerates, during spray drying and may be used to assist this manufacturing step provided they do not prevent or inhibit dispersion of the submicron particles in the end-use suspension.

The aforementioned milled slurry is subsequently spray dried to produce spheres approximately 20 microns to approximately 150 microns in size that are composed of loosely agglomerated submicron particles and are loaded with the dispersant. The dispersant is deposited onto the particles in terms of weight percent. The weight percent used depends on the nature of the particles (i.e. material composition and surface area) and the liquid media of choice (i.e. whether ethyl alcohol or water or some other liquid or combinations of liquids are used) and the chemical nature of the dispersant itself. Exemplary levels of dispersant may range from about 0.1% or less up to about 5% or more, for example, up to about 10% by weight. The dispersant may be deposited onto the particles by any conventional method, such as spray drying, oven drying or direct application that may not involve drying.

The resulting product is a powder that preferably has only a small content of free (i.e. non-agglomerated) submicron particles. The agglomerates formed from the primary particles can be spherical and/or non-spherical shape, e.g., ranging in sizes up to 10 microns, up to 300 microns, up to a millimeter or more, for example, up to 5 millimeters. In fact, as a result of the particular conditions of the spray drying process selected, the agglomerates can range from very small size of just several primary particles stuck together, to very large size of several millimeters. As a preferred embodiment, any agglomerate (or primary particle) size can be used that produces a free flowing, non-dusting powder—that can be poured, and be free flowing—either agglomerated or non-agglomerated.

This pre-formulated product may then be packaged, warehoused, sold and shipped as a suspension spray feedstock. The end user would blend this feedstock together with water and/or any typical liquid media (e.g., organic liquid) for suspensions used in suspension plasma spray including, for example, one or more of a ketone, alcohol, glycol, and or aliphatic hydrocarbons, such as, for example, acetone, methyl alcohol, ethyl alcohol, isopropyl alcohol, ethylene glycol, alkanes such as hexane or octane and mixtures thereof, in prescribed proportions (i.e., about 25% as an example) typically using a dispersing mixer. Conventional dispersion mixing of some form is typically used and may include, but not limited to, commercially available high speed batch or in-line mixers, commercial ultrasonic dispersion systems or jar milling, for example, to make-up the suspension that is subsequently used by a suspension feed system. This approach will enable the end user to prepare fresh suspensions as they need them, and eliminate the costly and difficult aspects of handling, processing storing and shipping large quantities of alcohol, by the manufacturer, for example.

While any coating material typically used in thermal spray coating processes can be adapted as the feedstock material for the processes described herein, some representative coating materials which can be used with the processes described herein, include, but are not limited to, at least one of: oxides of aluminum, zirconium, titanium, chromium, manganese cobalt, yttrium, lanthanum, lanthanum strontium, manganese, manganese cobalt iron, dysprosium; carbides of titanium, tantalum, tungsten, chromium, vanadium, nickel; lanthanum strontium manganite, pure metal and/or alloys based on nickel, cobalt iron, chromium, aluminum, copper; yttrium fluoride, lanthanum strontium cobalt ferrite, zirconia gadolinia ytterbia yttria, gadolinium zirconate, lanthanum strontium maganate, lanthanum strontium cobalt ferrite; zirconia stabilized with magnesia, calcia, dysprosia, yttria, ceria, ytterbia; ytterbium zirconate, strontium, and mixtures and/or composites thereof.

While the feedstock described herein is particularly useful for suspension thermal spray coating processes, such as, for example, suspension plasma spray (SPS) processes, suspension HVOF (high velocity oxy-fuel) processes, it may be adapted for use in additional thermal spray processes as well. The size of the primary particles produced by the processes described herein should be such that the particles are usable with suspension thermal spray systems. Typically, primary particles up to about 0.1 micron, up to about 1 micron, up to about 2 microns, up to about 3 microns, up to about 4 microns, up to about 5 microns, up to about 6 microns, up to about 7 microns, up to about 8 microns, up to about 9 microns and/or up to about 10 microns can be used, such that homogeneous, stable suspensions can be formed. While primary particles up to about 2 microns, for example, about 0.1 micron to 1 micron, have been found to be particularly useful, very small primary particles, e.g., nanoparticles, and other small particles up to about 0.1 micron, e.g., 0.01 micron to 0.1 micron, can also be used.

Dispersants include, but are not limited to polymer salts such as polyacrylic acid, 2-[2-(2-methoxyethoxy) ethoxy] acetic acid and polyethyleneimine, inorganic salts such as sodium metaphosphate and sodium tetraborate, and non-ionic organic compounds such as triethanolamine and TRITON X-100™, and acid and base compounds that produce dispersion effect through pH adjustment such as sodium bicarbonate and citric acid.

Using the correct quantity of dispersant is based on the amount of powder in the suspension. Users will typically want suspensions at different concentrations, i.e., 20% solids, 30% solids, etc. this requires the end user to know the correct amount of dispersant to use, calculate how much to use, and accurately measure. As described herein, since the correct amount of dispersant is already on the particles, for example, to produce a liquid suspension with suitable stability, particle dispersion and low viscosity for required material flow properties in the SPS feeding system, powder loading in any amount can be used, and the dispersant is always present in the correct amount, without the end user needing to know how much should be added. The user just adds as much liquid as they desire for their intended purpose, and the dispersant will already be present at the correct concentration.

The feedstock described herein is substantially dry, that is, the moisture content, typically less than about 0.05% by weight, is comparable to conventional feedstock powders used for thermal spray.

While the feedstock described herein may be composed of primary particles in agglomerated form, it is not required. While agglomeration does not improve or enhance the end-use suspension, some potential benefits include improved handling characteristics, reduced dusting, improved transfer and flow for the end user, etc.

Figure 5:
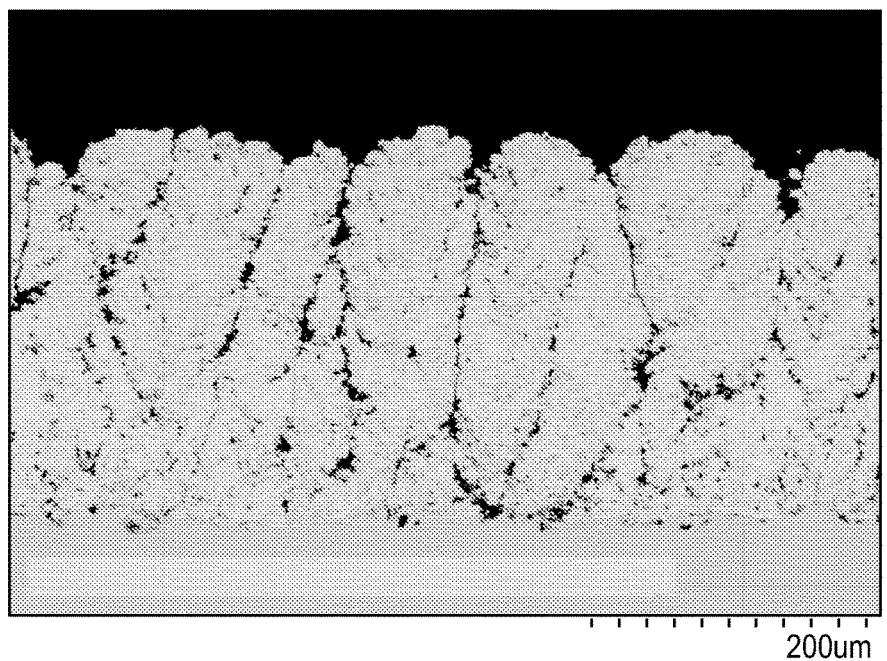
FIG. 5 shows an example of a suspension plasma spray coating as described herein.

Conventional binders, such as PVA or other latex, may optionally be included for the spray drying manufacturing step, but are not required. It's desirable to use enough binder to promote or facilitate agglomeration, i.e., fewer free particles. But care should be taken not to use so much that it prevents dissolution of agglomerates to release the primary particles when a carrier liquid is added. So the amount of binder used will depend on the specific binder selected, but typically, for example with PVA, amounts up to about 0.2% by weight have been found to work well.

Depending on the nature of the particular materials involved, exemplary levels of dispersant may be used from about 0.01% to about 10%, however, depending on the considerations recited above.

Example 1

A pre-formulated dry feedstock of YSZ (yttria stabilized zirconia) is prepared as follows. YSZ (Metco 204B-XCL) is milled to submicron particle size, as measured by conventional MICROTRAC S3500 measuring instrumentation to be D 90 <1.0 micro meter (μm) (i.e. 90% of particles less than 1 micro-meter in size) using a commercial mill to form a water-based slurry MS1. The slurry MS1 is transferred to a spray dryer tank with MEEA (2-[2-(2-methoxyethoxy) ethoxy] acetic acid) dispersant and PVA (polyvinyl alcohol) binder added. The slurry is spray dried to form agglomerates 10 microns to 100 microns in size, producing a pre-formulated, dry feedstock containing dispersant, designated as PF1, that is packaged and stored for later use. The dry feedstock is combined with ethanol to a 25% by weight solids content in a mixing vessel. A commercial high-speed dispersion mixer is used to fully break-up the spray dried agglomerates and disperse the submicron particles to form the suspension. The dispersant that is added at the spray drying step serves to stabilize the suspension. The dispersed suspension is now ready to use for suspension plasma spray. The suspension can be stored in containers prior to use. Immediately prior to use the suspension is remixed by simple mechanical means such as overhead stirrer, paint can shaker or shaking the container by hand, or using other similar means if it has been stored for more than a few hours.

FIG. 1 shows sprayed dried powder with 1% MEEA and 0.02% PVA. The 0.1% level of PVA also appears to be effective in producing spherical agglomerates. The 0.02% PVA level produces some spheres, with mostly smaller irregular shaped agglomerates.

Example 2

A pre-formulated dry feedstock of YSZ (yttria stabilized zirconia) is prepared as follows. YSZ (Metco 204B-XCL) is milled to submicron particle size, as measured by conventional MICROTRAC S3500 measuring instrumentation to be D 90 <1.0 micro meter (μm) (i.e. 90% of particles less than 1 micro-meter in size) using a commercial mill to form a water-based slurry MS2. MS2 was subsequently dried in an air circulating oven and then re-slurried with water and 1% MEEA, and then spray dried to produce a sample designated as SD4. No PVA was used. SD4 was tested to monitor changes in MEEA content and effectiveness in suspension following direct exposure to harsh conditions. Aliquots of SD4 were prepared as thin beds in trays and put into an environmental chamber set at 50° C. and 80% relative humidity (RH) for 28 days. The samples were subsequently measured for changes in MEEA content by combustion analysis to measure total carbon content and chemical strength through suspension stability tests. FIG. 2 shows that MEEA dispersant content on SD4 as measured by combustion analysis did not change significantly after 14 and 28 days of exposure. The small decrease may be due to measurement scatter. Also, the measured value of close to 1% indicates that the spray drying process did not decrease MEEA content of the powder.

Degradation in the effectiveness of MEEA dispersant through decomposition or oxidation may be detected through suspension stability testing by sedimentation rate. The sedimentation rate is measured by resting the suspension in a glass container and observing the top clear liquid phase over time. The sharp interface between the growing clear liquid layer at the top and the settling suspension containing the particles at the bottom is the sedimentation line. The sedimentation line gradually lowers over time as the suspension settles leaving the clear carrier liquid at the top. The suspension stability, or the effectiveness of the dispersant is measured by the rate in which the sedimentation line lowers. Sedimentation lines that remain high for the longest time indicates the best stability. The effectiveness of the dispersant for SD4 after exposure to 50° C. at 80% RH for 21 days is compared to SD4 stored under ambient condition (20° C.-30% RH for the same period in a stability test shown in FIG. 3. Test ethanol suspensions at 25% solids loading were prepared with the two SD4 samples for sedimentation rate analysis. The results show that the harsh condition exposure did not alter the effectiveness of MEEA dispersant on spray dried powder, as indicated by the comparable sedimentation rates over 168 hours.

Spray dried powder with 1% MEEA and 0.02% PVA was mixed with ethanol at 25% solids loading using a conventional high speed dispersion mixer to produce a test suspension S1. The suspension was sampled following 10 minutes and 20 minutes of mixing time, and then analyzed by conventional MICROTRAC for particle size distribution to determine the effectiveness of high speed mixing in reducing the agglomerates to their constituent particles.

The MICROTRAC measured results in FIG. 4 indicate that 10 minute dispersion mixing time was insufficient in breaking-up the agglomerates. 20 minutes of mixing time provided better agglomerate dissolution that approached the M measured results produced by 20 minutes of mixing followed by several minutes of sonication to fully break up the agglomerates.

Suspension prepared from the dispersion mixer test S1 was evaluated in a suspension feeder (Metco 5MPE-SF) and sprayed onto a steel substrate with a conventional TRIPLEXPRO™-210 plasma spray gun to confirm suspension handling and coating structure compared to conventional suspensions. No feeding issues were reported. The coating structure produced shows a columnar structure that is comparable with conventional suspensions (FIG. 5) using the same parameters.

Example 3

Figure 6:
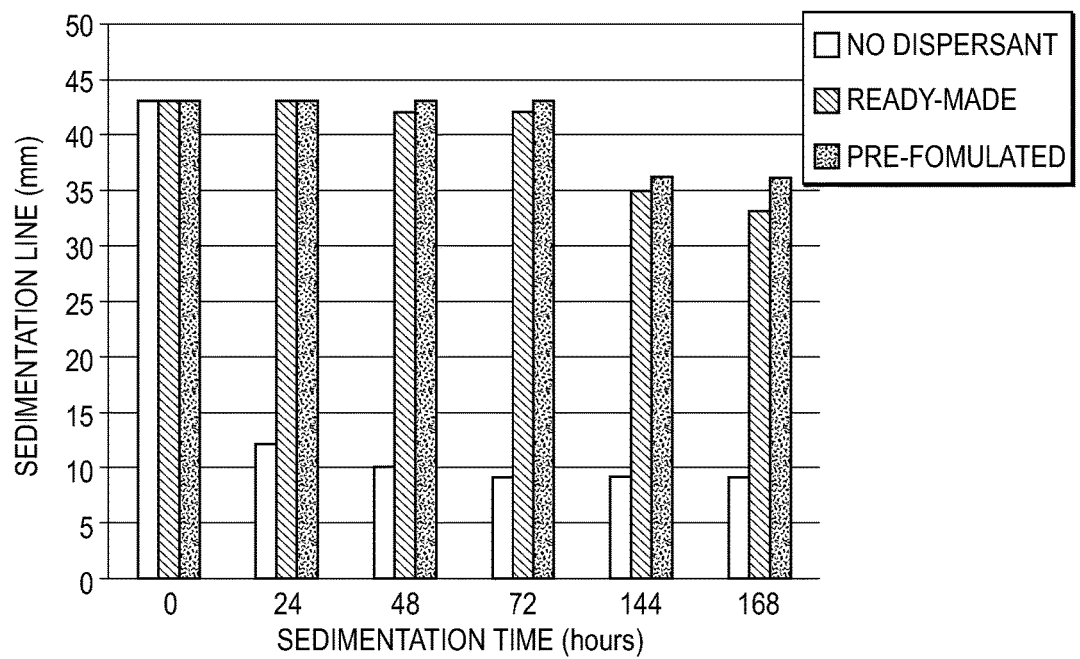
FIG. 6 shows examples of settling rates for products produced as described herein.

Sample PF1 is mixed with ethyl alcohol at 25% solids loading, and then dispersed through sonication treatment to produce stable suspension sample S2. Sample S2 is an example of a suspension produced from pre-formulated feedstock. Milled slurry MS2 that had been oven dried and then mixed with MEEA dispersant at 1% solids loading and ethyl alcohol at 25% solids loading and then dispersed through sonication treatment to produce a stable suspension sample S3. Sample S3 is an example of a suspension produced as a conventional ready-made method. Milled slurry MS2 that had been oven dried and then mixed with ethyl alcohol at 25% solids loading with no dispersant and then mixed through sonication treatment produced suspension sample S4 is an example of a suspension produced in absence of dispersant. FIG. 6 compares the sedimentation rates of these suspensions, i.e. from pre-formulated feedstock S2, ready-made method with dispersant S3, and ready-made method without dispersant S4. Stable suspensions with comparable sedimentation rates were observed for pre-formulated and ready-made suspensions S2 and S3. The ready-made suspension without dispersant had poor stability as observed by rapid sedimentation rate.

Figure 7:
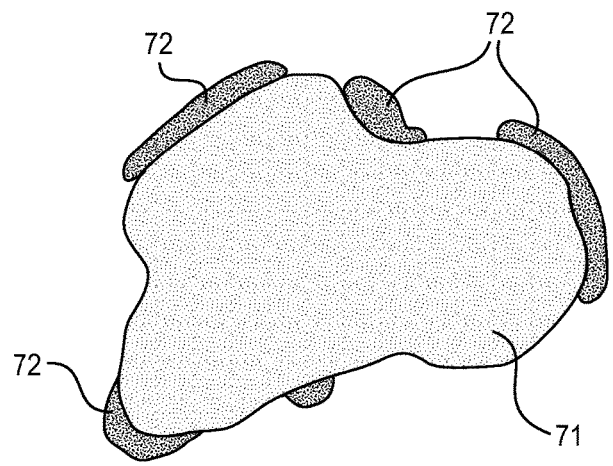
FIG. 7 shows a depiction of a particle with deposited dispersant as described herein.
Figure 8:
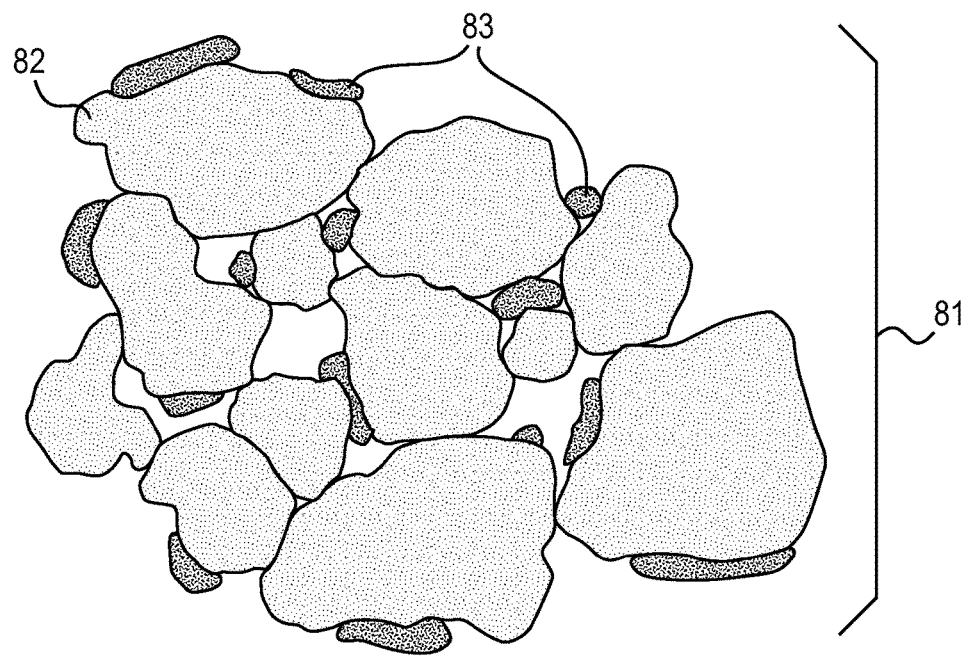
FIG. 8 shows a depiction of an agglomerate with deposited dispersant as described herein.
Figure 9:
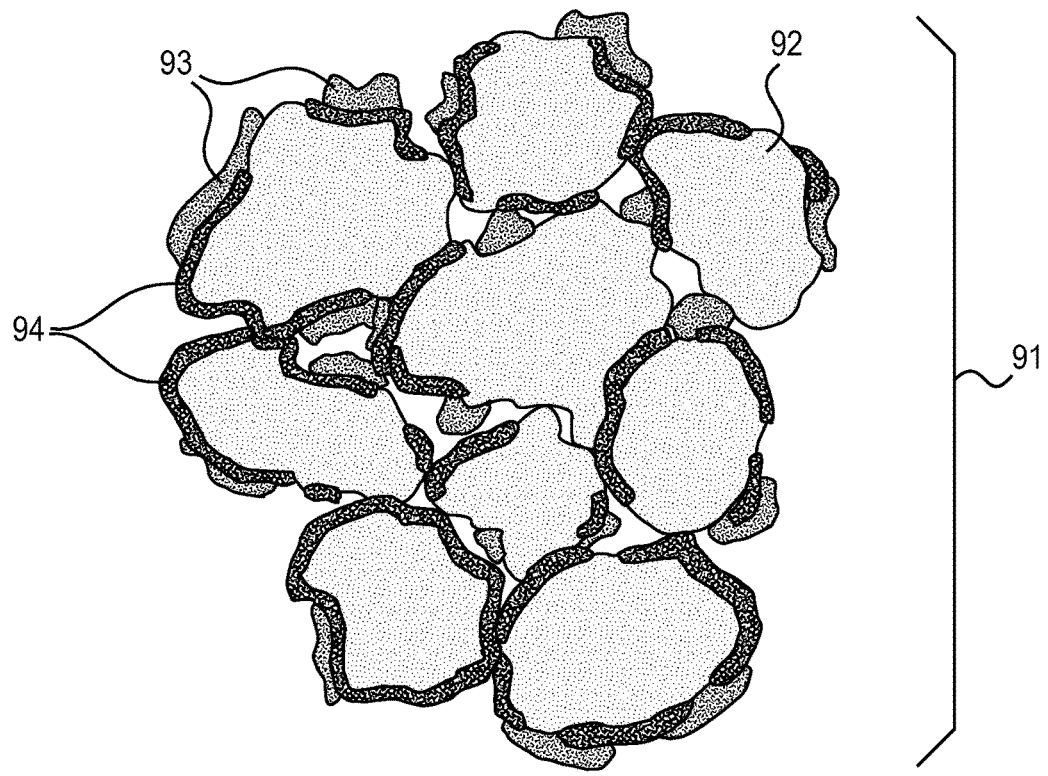
FIG. 9 shows a depiction of an agglomerate with deposited dispersant and binder as described herein.

A depiction of various embodiments described herein are also shown in FIGS. 7, 8 and 9. FIG. 7, for example shows a depiction of a particle 71 with dispersant 72 deposited thereon. FIG. 8 shows a depiction of an agglomerate 81 of individual particles 82 with dispersant 83 deposited thereon. And FIG. 9 shows a depiction of an agglomerate 91 of individual particles 92 with dispersant 93 and binder 94 deposited thereon.

Thus, the scope of the invention shall include all modifications and variations that may fall within the scope of the attached claims. Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A powder composition adapted for use in suspension thermal spray coating processes, wherein the powder composition comprises primary particles having at least one dispersing agent deposited thereon, the composition resulting in a homogeneous, stable suspension when combined with a liquid carrier use in suspension thermal spray processes, wherein the dispersing agent is 2-[2-(2-methoxyethoxy) ethoxy] acetic acid, and the primary particles comprise at least one of: oxides of aluminum, zirconium, titanium, chromium, manganese cobalt, yttrium, lanthanum, lanthanum strontium, manganese, manganese cobalt iron, dysprosium; carbides of titanium, tantalum, tungsten, chromium, vanadium, nickel; lanthanum strontium manganite, pure metal and/or alloys based on nickel, cobalt iron, chromium, aluminum, copper; yttrium fluoride, lanthanum strontium cobalt ferrite, zirconia gadolinia ytterbia yttria, gadolinium zirconate, lanthanum strontium maganate, lanthanum strontium cobalt ferrite; zirconia stabilized with magnesia, calcia, dysprosia, yttria, ceria, vtterbia; ytterbium zirconate, strontium, and mixtures and/or composites thereof.

2. The composition of claim 1, wherein the primary particles are agglomerated and/or non-agglomerated.

3. The composition of claim 1, wherein the primary particles are up to about 10 microns in size.

4. The composition of claim 1, wherein the primary particles are up to about 2 microns in size.

5. The composition of claim 1, wherein the primary particles are up to about 0.1 micron in size.

6. The composition of claim 1, wherein the primary particles are about 0.1 to about 1 micron in size.

7. The composition of claim 1, wherein the dispersing agent is present in an amount of up to about 5% by weight.

8. The composition of claim 1, wherein the dispersing agent is present in an amount of about 0.1% to about 1% by weight.

9. The composition of claim 1, wherein the powder composition additionally contains a binder deposited on the primary particles.

10. The composition of claim 9, wherein the binder is polyvinyl alcohol.

11. The composition of claim 9, wherein the binder is present in an amount up to about 5% by weight.

12. The composition of claim 9, wherein the binder is present in an amount up to about 0.2% by weight.

13. The composition of claim 9, wherein the binder is present in an amount of about 0.01% to about 0.2% by weight.

14. The composition of claim 1, wherein the liquid carrier is an organic liquid.

15. The composition of claim 1, wherein the liquid carrier is one or more of a ketone, alcohol, glycol, and or aliphatic hydrocarbons.

16. The composition of claim 1, wherein the liquid carrier is one or more of water, acetone, methyl alcohol, ethyl alcohol, isopropyl alcohol, ethylene glycol, hexane, and/or octane.

17. The composition of claim 1, additionally containing sufficient liquid to be in paste form.

18. A homogenous, stable suspension used in suspension spray coating processes, wherein the suspension comprises (a) a powder composition comprising primary particles having at least one dispersing agent thereon and (b) a liquid carrier; the dispersing agent is a polymer salt, an inorganic salt, a non-ionic organic compound, and/or acid or base that produces dispersion effect through pH adjustment and is present in an amount of up to about 10% by weight; the liquid carrier is a liquid selected form the group consisting of water, a ketone, an alcohol, a glycol, an aliphatic hydrocarbon, and combinations thereof; and the primary particles comprise at least one of: oxides of aluminum, zirconium, titanium, chromium, manganese cobalt, yttrium, lanthanum, lanthanum strontium, manganese, manganese cobalt iron, dysprosium; carbides of titanium, tantalum, tungsten, chromium, vanadium, nickel; lanthanum strontium manganite, pure metal and/or alloys based on nickel, cobalt iron, chromium, aluminum, copper; yttrium fluoride, lanthanum strontium cobalt ferrite, zirconia gadolinia ytterbia yttria, gadolinium zirconate, lanthanum strontium maganate, lanthanum strontium cobalt ferrite; zirconia stabilized with magnesia, calcia, dysprosia, yttria, ceria, vtterbia; ytterbium zirconate, strontium, and mixtures and/or composites thereof.

19. A homogenous, stable suspension used in suspension spray coating processes, wherein the suspension comprise (a) a powder composition comprising primary particles having at least one dispersing agent deposited thereon, wherein the dispersing agent is 2-[2-(2-methoxyethoxy)

ethoxy] acetic acid and is present in an amount of up to about 10% by weight, and (b) a liquid carrier[[; the dispersing agent is 2-[2-(2-methoxyethoxy) ethoxy] acetic acid, and is present in an amount of up to about 10% by weight and]] wherein the liquid carrier is an organic liquid.

20. The suspension of claim 19, wherein the powder composition additionally contains a binder deposited on the primary particles.

21. The suspension of claim 18, wherein the liquid carrier is acetone, methyl alcohol, isopropyl alcohol, ethylene glycol, hexane, and/or octane.

22. The suspension of claim 18, wherein the primary particles are agglomerated and/or non-agglomerated.

23. The suspension of claim 18, wherein the primary particles are up to about 10 microns in size.

24. The suspension of claim 18, wherein the primary particles are up to about 2 microns in size.

25. The suspension of claim 18, wherein the primary particles are up to about 0.1 micron in size.

26. The suspension of claim 18, wherein the primary particles are about 0.1 to about 1 micron in size.

27. The suspension of claim 18, wherein the dispersing agent is 2-[2-(2-methoxyethoxy) ethoxy] acetic acid.

28. The suspension of claim 18, wherein the dispersing agent is present in an amount of up to about 5% by weight.

29. The suspension of claim 18, wherein the dispersing agent is present in an amount of about 0.1% to about 1% by weight.

30. The suspension of claim 18, wherein the powder composition additionally contains a binder deposited on the primary particles.

31. The suspension of claim 30, wherein the binder is polyvinyl alcohol.

32. The suspension of claim 30, wherein the binder is present in an amount up to about 5% by weight.

33. The suspension of claim 30, wherein the binder is present in an amount up to about 0.2% by weight.

34. The suspension of claim 30, wherein the binder is present in an amount of about 0.01% to about 0.2% by weight.

35. The suspension of claim 18, wherein the liquid carrier is an organic liquid.

36. The suspension of claim 35, wherein the organic liquid is one or more of a ketone, alcohol, glycol, and or aliphatic hydrocarbons.

* * * * *